United States Patent [19]

Louie

[11] 4,408,925
[45] Oct. 11, 1983

[54] CABLE TENSION METER
[75] Inventor: Edmund A. Louie, San Jose, Calif.
[73] Assignee: GTE Products Corporation, Stamford, Conn.
[21] Appl. No.: 276,238
[22] Filed: Jun. 22, 1981
[51] Int. Cl.$^3$ ............................................... B25G 3/00
[52] U.S. Cl. ...................................... 403/27; 403/43; 411/10
[58] Field of Search .................. 403/27, 43, 44, 45, 403/46, 47, 48; 411/10, 11, 12, 9

[56] References Cited
U.S. PATENT DOCUMENTS

| 97,238 | 11/1869 | Shock | 403/44 |
| 3,389,924 | 6/1968 | Bush et al. | 403/27 |
| 3,925,869 | 12/1975 | Thompson | 403/27 X |

FOREIGN PATENT DOCUMENTS

| 2950294 | 6/1981 | Fed. Rep. of Germany | 411/9 |
| 55325 | 6/1951 | France | 403/46 |
| 389331 | 10/1973 | U.S.S.R. | 403/43 |

Primary Examiner—Andrew V. Kundrat
Attorney, Agent, or Firm—John F. Lawler

[57] ABSTRACT

A turnbuckle assembly has a self-contained tension pre-load indicator utilizing internally mounted compact conical spring washers (belleville washers) and a radially projecting movable stem which is rendered immovable when the washers are fully compressed into a flat configuration. The turnbuckle sleeve has an arcuate slot through which the stem extends for accessibility to the operator who determines the attainment of the desired tension pre-load force by the immovability of the stem. The stem is connected to a plane washer disposed adjacent to but slightly axially spaced from the peripheral convex edge surface portions of the end spring washer which when flattened engages the plane washer and prevents it from moving.

2 Claims, 5 Drawing Figures

CABLE TENSION METER

BACKGROUND OF THE INVENTION

This invention was made under a contract with the Department of the Army.

This invention relates to coupling devices and more particularly to an improved turnbuckle assembly.

Wire rope cables and the like are used as structural elements for many purposes such as bracing antenna towers, securing loads on railroad cars, and tying down equipment on motor vehicles. Proper use of such cables requires that they be stressed with a predetermined pre-load tension force in order to perform this structural function. A common coupling device for performing this tensioning function is the turnbuckle. When the turnbuckle is used, the present practice for determining the pre-load tension force on the cables is to attach to the cables a separate tension measuring instrument which translates cable deformation into cable tension on a direct reading dial. The disadvantages of this technique are the need for a separate measuring instrument which must be stored and carefully handled, the requirement of periodic calibration of the instrument, and the general nonavailability of such instruments for larger cables, i.e., one-half inch diameter and more.

This invention is directed to the provision of a turnbuckle assembly which overcomes these problems.

OBJECTS AND SUMMARY OF THE INVENTION

A general object of the invention is the provision of a turnbuckle assembly which has a self-contained tension pre-load indicator.

A further object is the provision of such a turnbuckle assembly that is compact and as simple to operate as a standard turnbuckle.

These and other objects are achieved with a turnbuckle assembly having a plurality of concavo-convex or conical washers mounted within the turnbuckle sleeve so as to be compressed with a compression force equal to the tension force on the tension members, and means for indicating to the operator when such washers are compressed to a flat configuration.

DESCRIPTION OF PREFERRED EMBODIMENT

Figures 1, 4:
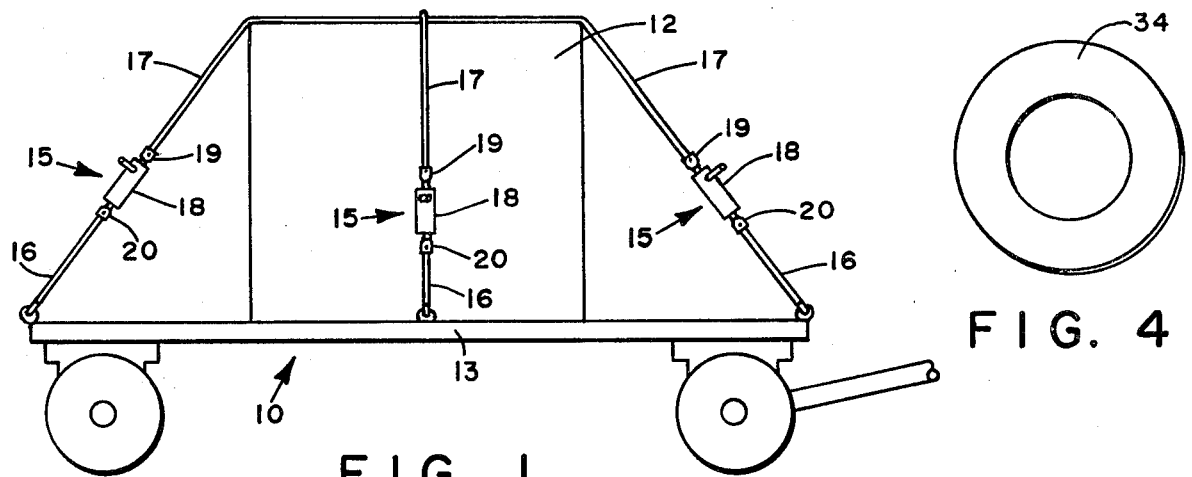
FIG. 1 is a schematic side elevation of a loaded trailer with tie down cables and turnbuckle assemblies for securing the load to the trailer bed.
FIG. 4 is a plan view of one of the conical spring washers forming part of the invention.
Figure 2:
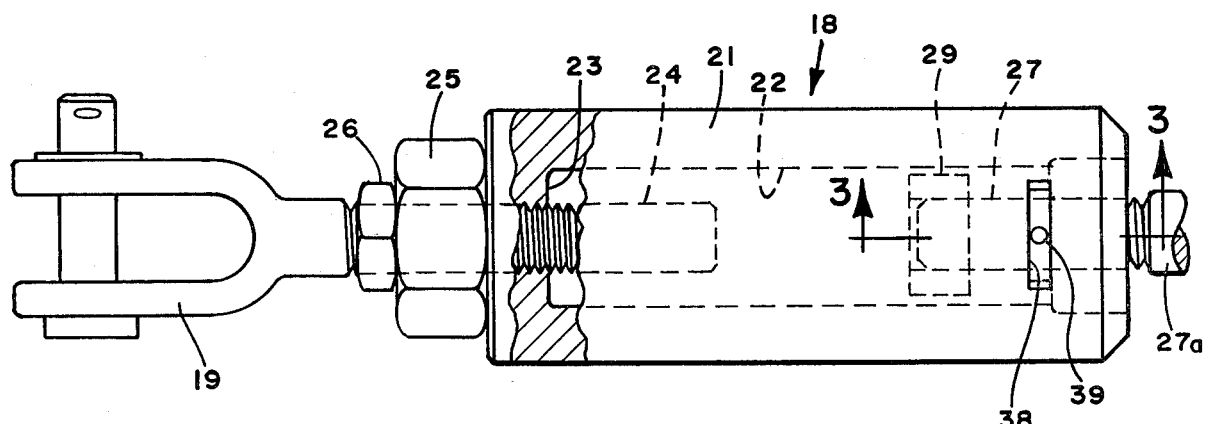
FIG. 2 is a side elevation partly in section of the turnbuckle assembly embodying the invention.

Referring now to the drawing, FIG. 1 illustrates an application of this invention to a vehicle 10 such as a trailer having a load 12 secured to its bed 13 by a plurality of tension devices 15, each comprising tension members 16 and 17 anchored to the trailer bed and connected to each other through a turnbuckle assembly 18. The tension force applied to members 16 and 17 generally is specified to have a predetermined value appropriate to load conditions and is applied by the turnbuckle assembly 18 through couplers 19 and 20 connected to the members. In accordance with this invention, turnbuckle assembly 18 incorporates a mechanism for indicating when the specified pre-load tension force has been reached to avoid overstressing or understressing the tension members.

Referring now to FIGS. 2, 3, 4 and 5, turnbuckle assembly 18 comprises a sleeve 21 having a cylindrical bore 22 which is reduced and threaded at one end 23 to engage the threaded shank 24 of a coupler 19. A jam nut 25 and lock nut 26 prevents rotation of sleeve 2 relative to shank 24 after the desired pre-load tension force has been applied to tension members 16 and 17.

Substantially identical coupler 20 has a threaded shank 27 connected to the opposite end of sleeve 21 in such a manner that coupler 20 and its shank 27 are free to rotate or swivel relative to the sleeve. To this end, the inner end of shank 27 is threadedly connected to a nut 29 having a cylindrical outer surface 29a with a diameter slightly less than the diameter of bore 22 of sleeve 21. The outer end portion of sleeve bore 22 is threaded as indicated at 31 to receive an externally threaded bushing 32 having a central bore 33 with a diameter slightly larger than the diameter of threaded shank 27 but less than the diameter of the unthreaded portion 27a of shank 27, see FIG. 2.

In order to indicate the stressing of tension members 16 and 17 with a pre-load tension force of a predetermined value in accordance with this invention, a plurality of conical or belleville spring washers 34 and plane washers 35 and 36 are mounted within sleeve bore 22 coaxially of shank 27 between and abutting against nut 29 and bushing 32. Spring washers 34, one of which is shown in FIG. 4, have outer diameters slightly less than the diameter of bore 22 and have internal diameters equal to or slightly larger than the diameter of shank 27. The number and dimensions of spring washers 34 are selected from a specification sheet published by the washer manufacturer to require a compression force of predetermined value in order to flatten them. Inner washer 35 has an inner diameter slightly larger than the diameter of shank 27. Outer washer 36 has an outer diameter slightly less than the diameter of sleeve bore 22, has an inner diameter larger than the outer diameter of inner washer 35, see FIG. 5, and preferably has an axial diameter slightly larger than that of inner washer 35. An arcuate slot 38 is formed in sleeve 21 in radial alignment with outer washer 36 and a stem 39 threadedly connected at its inner end to a tapped hole 40 in outer washer 36 projects through slot 38 outwardly from the outer surface of sleeve 21.

Figures 3, 5:
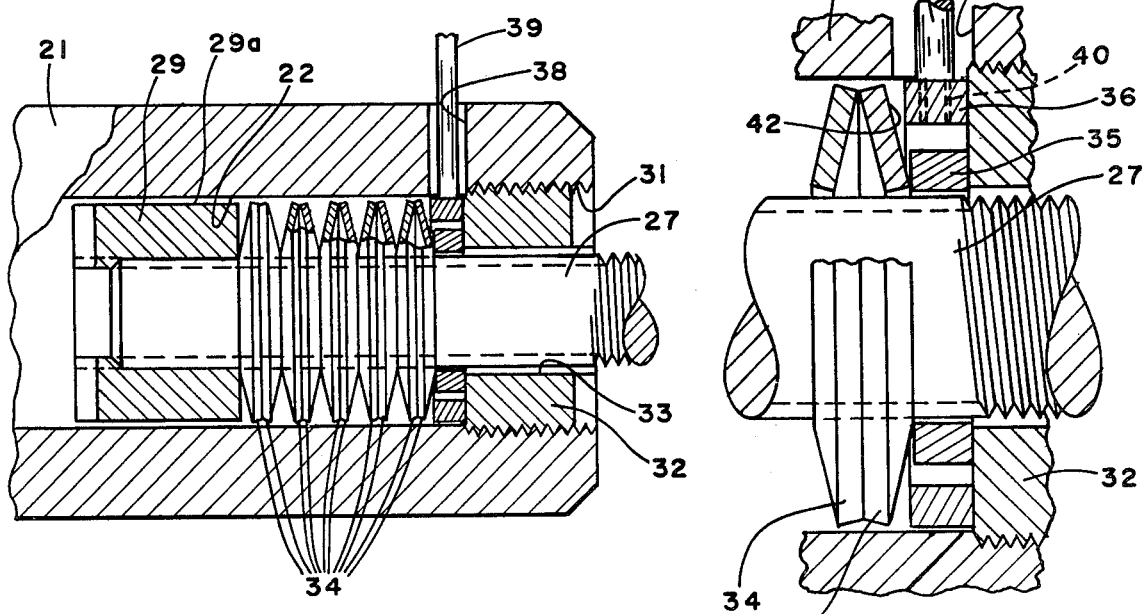
FIG. 3 is an enlarged section of part of the turnbuckle taken on line 3—3 of FIG. 2. ;p
FIG. 5 is a greatly enlarged portion of FIG. 3 showing details of construction.

Conical washers 34 are mounted on shank 27 such that the convex surface 42 of end washer 34e is adjacent to plane washers 35 and 36. With this washer orientation, convex surface 42 of the end washer engages inner washer 35 but is slightly axially spaced from outer washer 36 when the assembly is in the relaxed or untensioned state as shown in FIGS. 3 and 5. When the assembly is in a relaxed state, outer washer 36 is rotatable within the sleeve and stem 39 is correspondingly movable in slot 38. When spring washers 34 are fully compressed into a flat configuration by operation of the turnbuckle assembly in stressing the tension members, the outer peripheral edge portions of convex surface 42 of end washer 34e engages outer washer 36 and locks it as well as stem 39 against rotational movement.

In operation, the turnbuckle assembly 18 is assembled by mounting bushing 32, plane washers 35 and 36, spring washers 34, and nut 29, in that order, on the end of coupler shank 27 which is then inserted into sleeve bore 22 until outer washer 36 is aligned with slot 38 in the sleeve. Bushing 32 is then threaded within sleeve 21 into abutment with the plane washers so that the latter and spring washers 35 are snugly held in a fixed axial position on shank 27. Stem 39 is thereafter connected to outer washer 36.

Coupler 19 is next threaded into sleeve 21 with maximum extension of the coupler from the sleeve and with jam nut 25 and lock nut 26 loosened. Tension members 16 and 17 are anchored to the trailer and to the load and are connected to both couplers 19 and 20 so that the tension members are fairly taut. Sleeve 21 is next rotated relative to the couplers with a torque wrench thereby reducing the spacing between the couplers and applying a tension force to tension members 16 and 17. At the same time, conical washers 34 are compressed with a force equal to the tension force on tension members 16 and 17.

After several turns of the torque wrench, the operator makes a finger test of the movability of stem 39 to determine if the predetermined pre-load tension force has been reached. If the stem is still movable, indicating less than the desired stress on the tension members, he turns the turnbuckle sleeve a few more times and repeats the stem movability test. When the stem is no longer movable, full compression of the spring washers and the specified pre-load tension force on tension members is indicated. Alternatively, the operator may rotate the sleeve with one hand and continually oscillate stem 39 with a finger of the other hand to determine more precisely when the specified pre-load tension force has been reached.

After the above operation, jam nut 25 and lock nut 26 are tightened against the sleeve to prevent loosening of the turnbuckle assembly.

What is claimed is:

1. In a turnbuckle assembly having a sleeve, a first coupler threadedly connected to one end of said sleeve, a second coupler spaced from said first coupler and connected to the other end of said sleeve, said couplers being adapted to be connected to externally anchored tension members, said sleeve being rotatable relative to said couplers for shortening the distance therebetween and subjecting the members to a tension force, the improvement of means for indicating the application to said members of a tension force of predetermined value comprising:

first abutment means on the inner end of the second coupler, second abutment means on said sleeve at said other end thereof, spring means comprising a plurality of concave-convex washers between and in engagement with said first and second abutment means adapted to be compressed with a force proportional to the tension force on said members upon rotation of said sleeve relative to said members, means responsive to compression of said spring means upon rotation of said sleeve relative to said members for indicating attainment of the tension force of predetermined value on said members, one of said washers having a convex surface proximate to said second abutment means, a plane washer being disposed between said convex surface and said second abutment means, said plane washer being spaced from said convex surface when the compression force in said spring means is less than the predetermined value and engaging said convex surface when said compression force is equal to the predetermined value, and means connected to said plane washer for indicating contact of said surface with said plane washer whereby to indicate a pre-load tension force of said predetermined value on said members.

2. The assembly according to claim 1 in which said sleeve has an arcuate slot radially aligned with said plane washer, said last named means comprising a stem connected to said plane washer and projecting radially therefrom through said slot.

* * * * *